(12) United States Patent
Simshaw

(10) Patent No.: US 11,122,652 B2
(45) Date of Patent: Sep. 14, 2021

(54) WINDSHIELD HEATING SYSTEM

(71) Applicant: Lyle A. Simshaw, Tualatin, OR (US)

(72) Inventor: Lyle A. Simshaw, Tualatin, OR (US)

( * ) Notice: Subject to any disclaimer, the term of this patent is extended or adjusted under 35 U.S.C. 154(b) by 1009 days.

(21) Appl. No.: 15/392,405

(22) Filed: Dec. 28, 2016

(65) Prior Publication Data

US 2018/0180290 A1    Jun. 28, 2018

(51) Int. Cl.
| | |
|---|---|
| *F24C 1/08* | (2006.01) |
| *H05B 3/84* | (2006.01) |
| *B60S 3/00* | (2006.01) |
| *H05B 3/00* | (2006.01) |
| *F24H 3/00* | (2006.01) |
| *B60S 3/04* | (2006.01) |

(52) U.S. Cl.
CPC ............... *H05B 3/84* (2013.01); *B60S 3/00* (2013.01); *H05B 3/0042* (2013.01); *B60S 3/045* (2013.01); *F24H 3/002* (2013.01); *F24H 2250/14* (2013.01)

(58) Field of Classification Search
CPC .... H05B 3/0076; H05B 3/008; H05B 3/0085; H05B 3/009
See application file for complete search history.

(56) References Cited

U.S. PATENT DOCUMENTS

| | | | | |
|---|---|---|---|---|
| 2,500,872 | A * | 3/1950 | Keniston | F26B 3/30 |
| | | | | 392/413 |
| 2,951,928 | A | 9/1960 | Gialanella | |
| 4,265,029 | A * | 5/1981 | Jenkins | F26B 9/00 |
| | | | | 219/537 |
| 4,322,779 | A * | 3/1982 | Bohme | G03B 15/02 |
| | | | | 362/17 |
| 4,366,368 | A * | 12/1982 | Stephens, III | F24H 3/062 |
| | | | | 15/405 |
| 4,513,357 | A * | 4/1985 | Nieda | F21S 48/1109 |
| | | | | 313/115 |
| 4,523,256 | A * | 6/1985 | Small | G03B 15/02 |
| | | | | 248/125.1 |
| 4,682,578 | A | 7/1987 | Schmidt | |
| 5,537,003 | A * | 7/1996 | Bechtel | H05B 39/042 |
| | | | | 315/82 |
| 5,672,003 | A * | 9/1997 | Shemitz | F21S 2/00 |
| | | | | 248/214 |
| 6,283,656 | B1 * | 9/2001 | Jiang | B60S 3/047 |
| | | | | 15/103 |
| 6,601,983 | B1 | 8/2003 | Runfola et al. | |
| 6,987,267 | B1 * | 1/2006 | Monroe | G01J 5/04 |
| | | | | 250/342 |

(Continued)

FOREIGN PATENT DOCUMENTS

| | | | |
|---|---|---|---|
| JP | 2003-213646 | * | 7/2003 |
| JP | 2012-162907 | * | 8/2012 |

(Continued)

*Primary Examiner* — Ibrahime A Abraham
*Assistant Examiner* — Gyounghyun Bae

(57) ABSTRACT

A windshield heating system includes a vehicle that has a windshield. A heat lamp unit is provided and the heat lamp unit is selectively coupled to a support and the heat lamp unit is pointed toward the windshield of the vehicle. The heat lamp unit selectively emits electromagnetic radiation to melt frozen precipitation from the windshield. A remote control is provided and the remote control may be manipulated to turn the heat lamp unit on and off.

1 Claim, 5 Drawing Sheets

(56) References Cited

U.S. PATENT DOCUMENTS

| | | | |
|---|---|---|---|
| 7,163,325 B2* | 1/2007 | Kojima | G09F 19/18 362/296.02 |
| 7,677,753 B1* | 3/2010 | Wills | F21S 6/00 362/161 |
| 7,783,400 B1* | 8/2010 | Zimler | B60S 1/0866 219/202 |
| 8,544,460 B2 | 10/2013 | Befus | |
| 8,614,406 B2 | 12/2013 | Hall, Jr. et al. | |
| D735,306 S | 7/2015 | Ericson | |
| 9,603,200 B1* | 3/2017 | Bennett | H05B 3/84 |
| 9,803,835 B2* | 10/2017 | Gordon | F21V 13/04 |
| 9,832,833 B1* | 11/2017 | Pipe-Mazo | H05B 33/0854 |
| 2003/0012563 A1* | 1/2003 | Neugebauer | G05D 23/1905 392/365 |
| 2005/1063776 | 5/2005 | Nielson et al. | |
| 2005/0174546 A1* | 8/2005 | Kuroda | G03B 21/10 353/85 |
| 2006/0142900 A1* | 6/2006 | Rothman | H04L 12/2803 700/295 |
| 2007/0091597 A1* | 4/2007 | Wang | F21S 10/02 362/231 |
| 2007/0242235 A1* | 10/2007 | Ohno | G03B 21/16 353/84 |
| 2007/0272884 A1* | 11/2007 | Utida | B60S 1/0822 250/573 |
| 2010/0141153 A1* | 6/2010 | Recker | H05B 33/0803 315/149 |
| 2010/0275530 A1* | 11/2010 | Laskowski | E04B 2/7453 52/173.1 |
| 2010/0296285 A1* | 11/2010 | Chemel | F21S 2/005 362/235 |
| 2011/0103065 A1* | 5/2011 | Cowan | F21V 17/164 362/296.01 |
| 2012/0145699 A1* | 6/2012 | McMahan | H05B 3/0076 219/533 |
| 2012/0206050 A1* | 8/2012 | Spero | B60Q 1/04 315/152 |
| 2012/0279950 A1* | 11/2012 | Chan | F24C 7/065 219/201 |
| 2013/0114188 A1* | 5/2013 | Fitzgibbon | H04W 8/005 361/679.01 |
| 2014/0246603 A1* | 9/2014 | Wilson | G21K 5/00 250/492.1 |
| 2016/0178171 A1* | 6/2016 | Reid | F21S 2/00 362/249.11 |

FOREIGN PATENT DOCUMENTS

| | | | | |
|---|---|---|---|---|
| JP | 2015-200147 | * | 7/2018 | |
| JP | 6362388 B2 | * | 7/2018 | |
| WO | WO 95/05308 A1 | * | 2/1995 | B64F 5/27 |
| WO | WO-9505308 A1 | * | 2/1995 | B64F 5/27 |

* cited by examiner

WINDSHIELD HEATING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to heating devices and more particularly pertains to a new heating device for remotely melting frozen precipitation from a windshield.

BRIEF SUMMARY OF THE INVENTION

An embodiment of the disclosure meets the needs presented above by generally comprising a vehicle that has a windshield. A heat lamp unit is provided and the heat lamp unit is selectively coupled to a support and the heat lamp unit is pointed toward the windshield of the vehicle. The heat lamp unit selectively emits electromagnetic radiation to melt frozen precipitation from the windshield. A remote control is provided and the remote control may be manipulated to turn the heat lamp unit on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
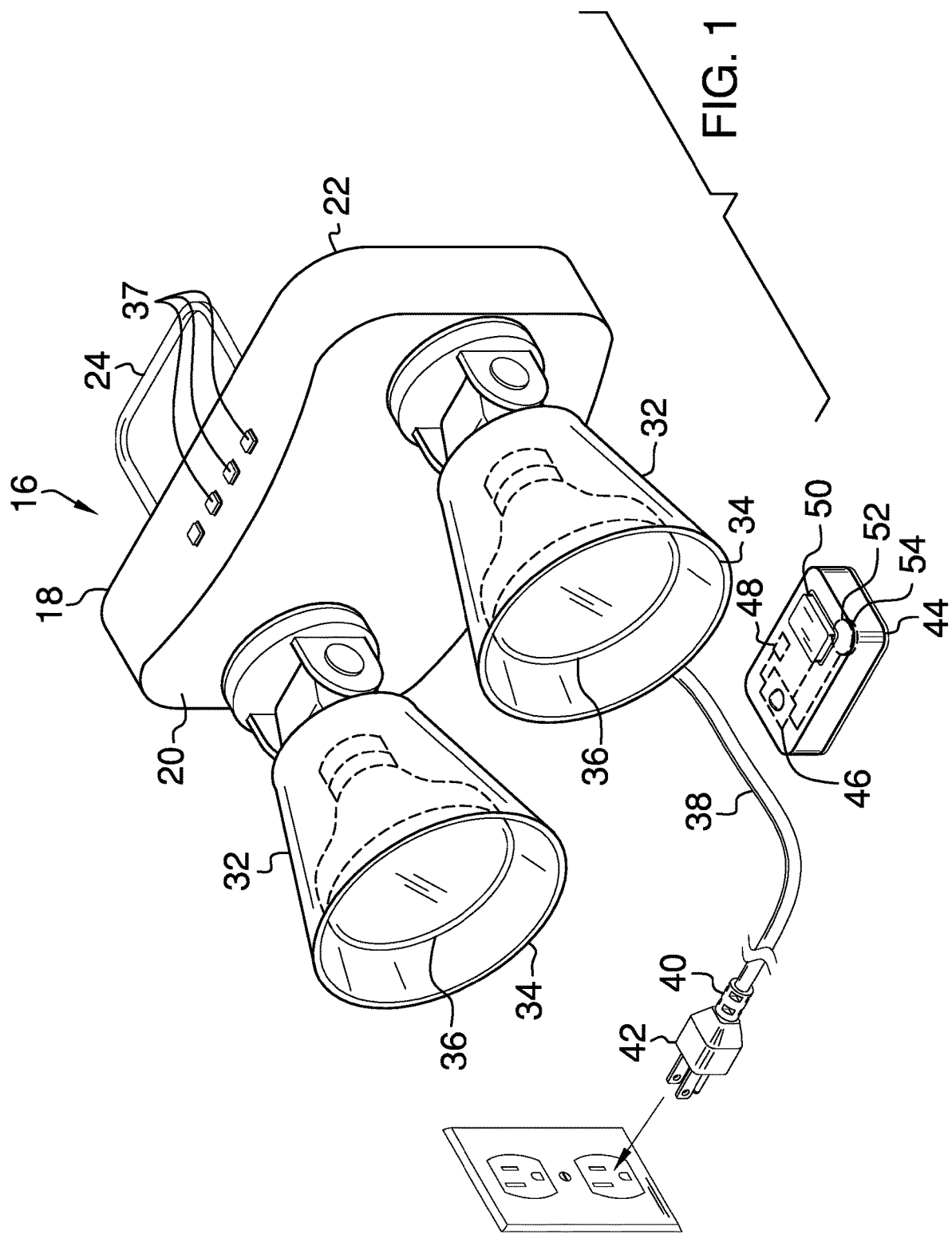
FIG. 1 is a front view of a heat lamp unit of a windshield heating system according to an embodiment of the disclosure.
Figure 2:
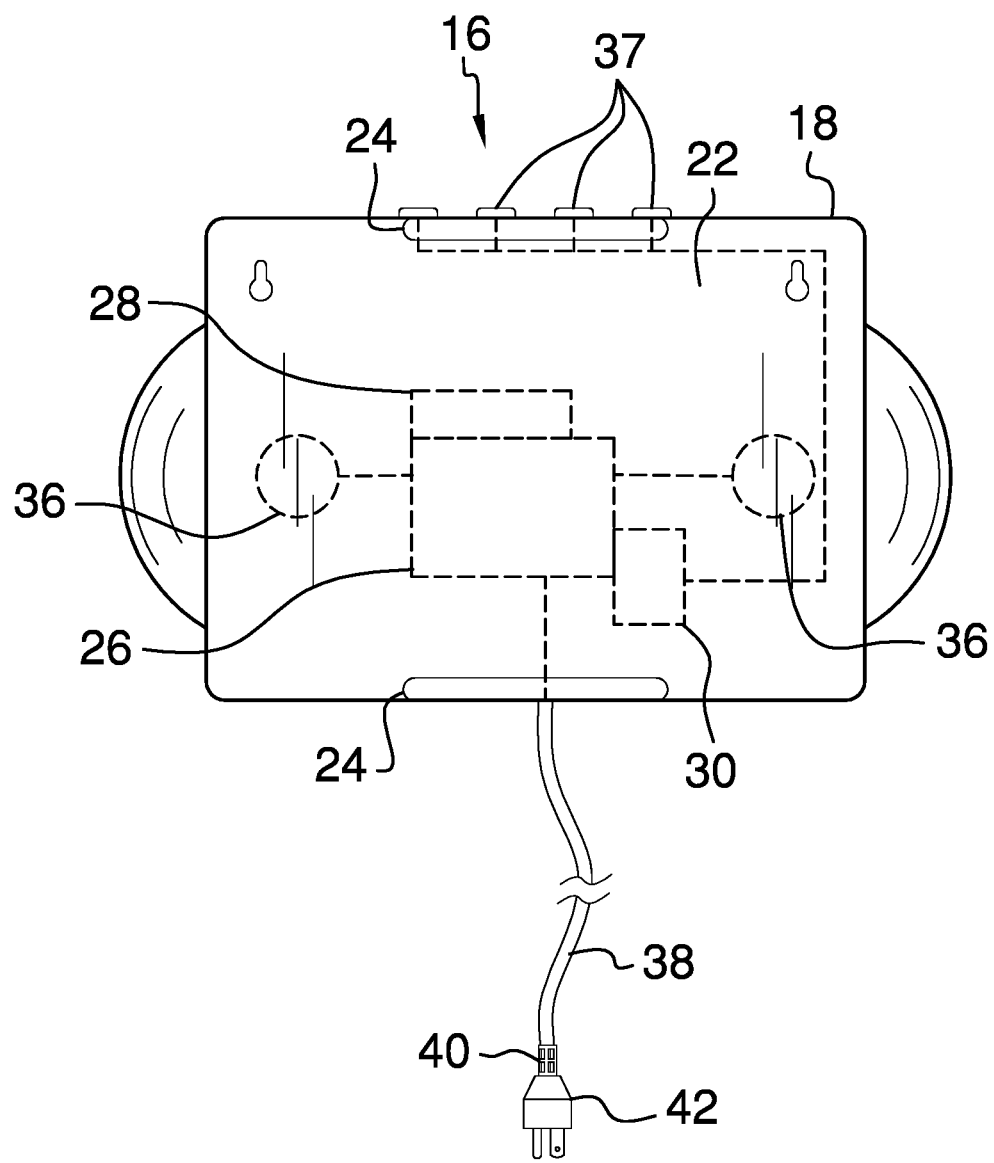
FIG. 2 is a back phantom view of a heat lamp unit of an embodiment of the disclosure.
Figure 3:
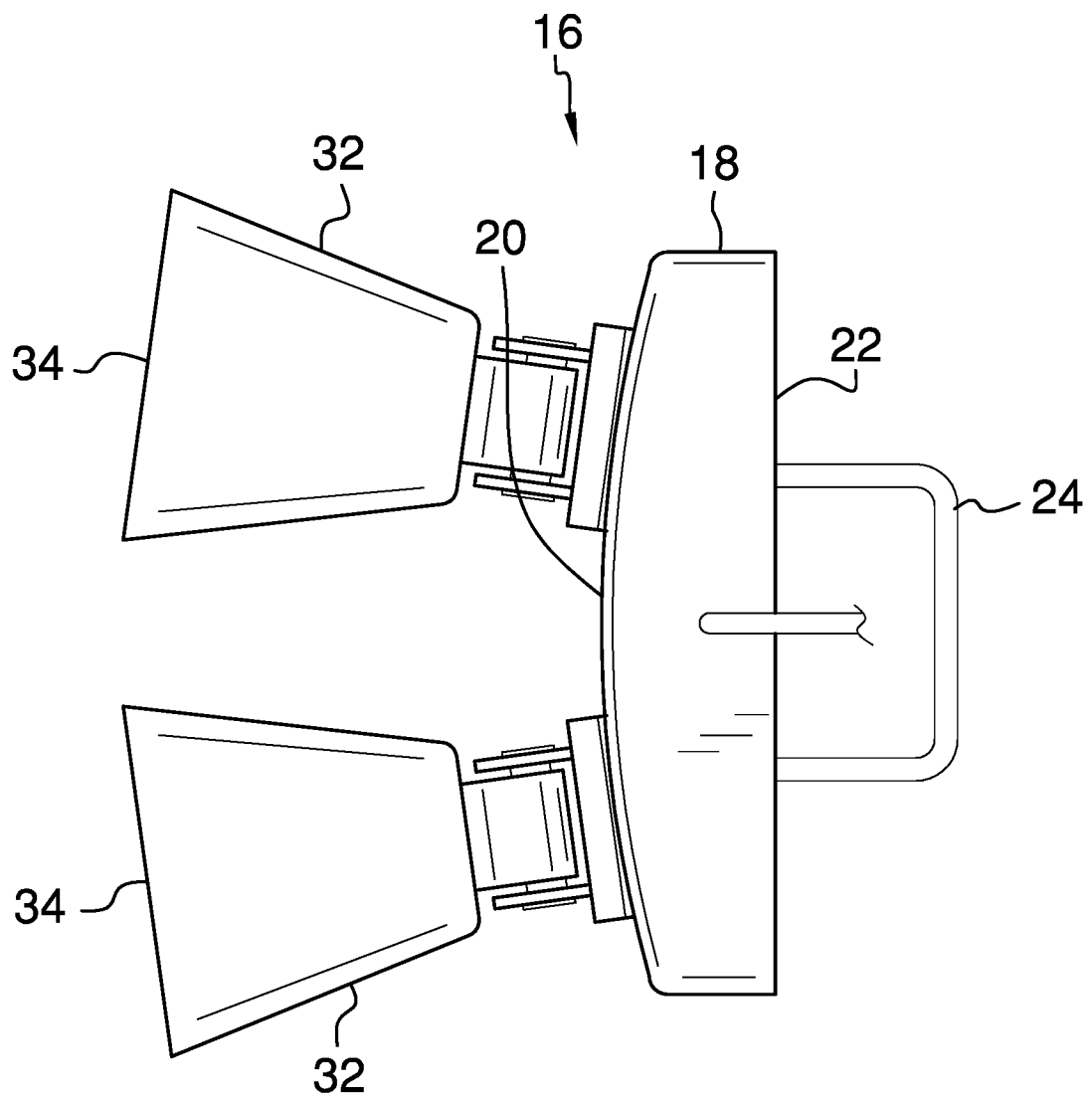
FIG. 3 is a bottom view of a heat lamp unit of an embodiment of the disclosure.
Figure 4:
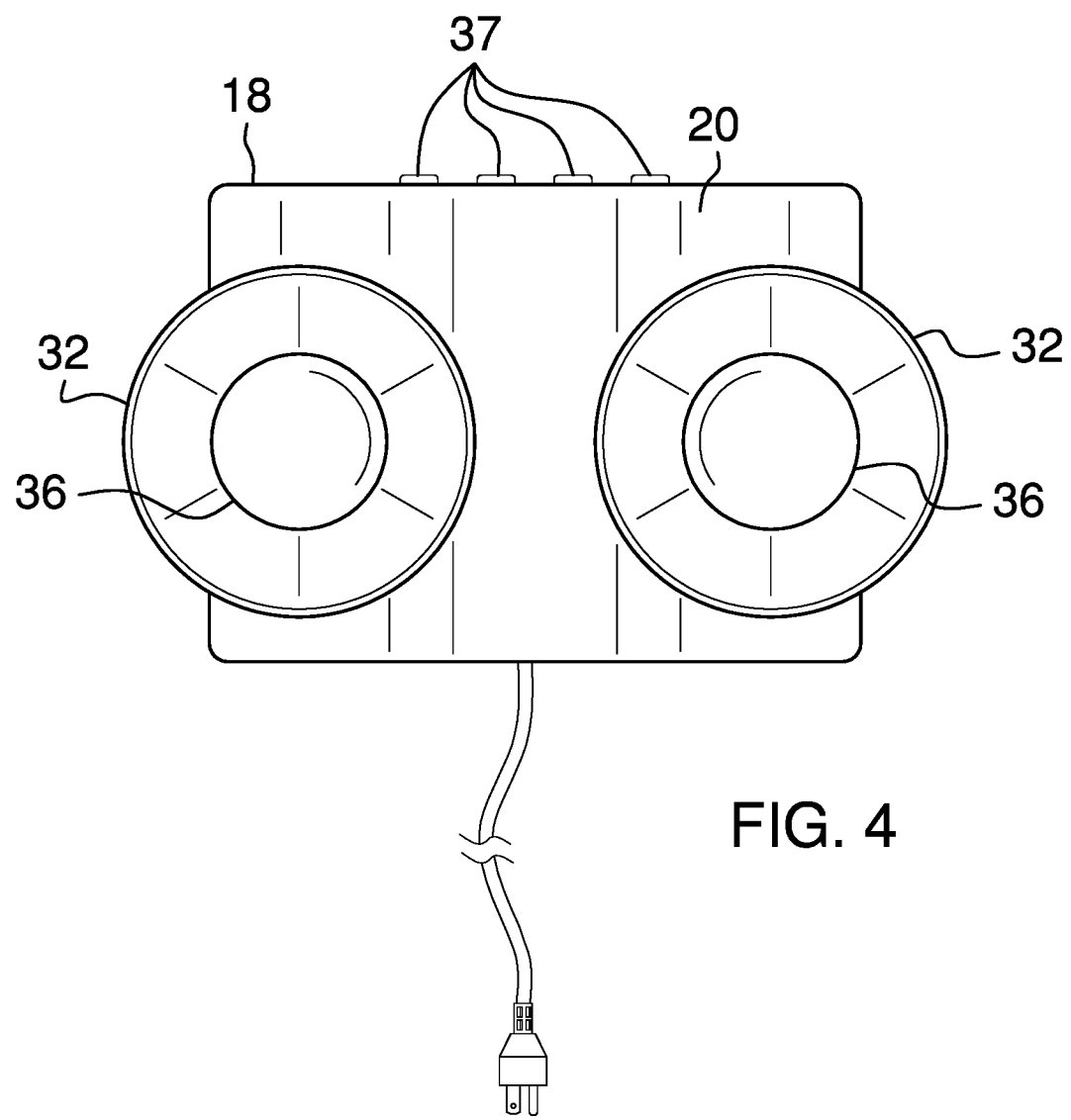
FIG. 4 is a front view of heat lamp unit of an embodiment of the disclosure.
Figure 5:
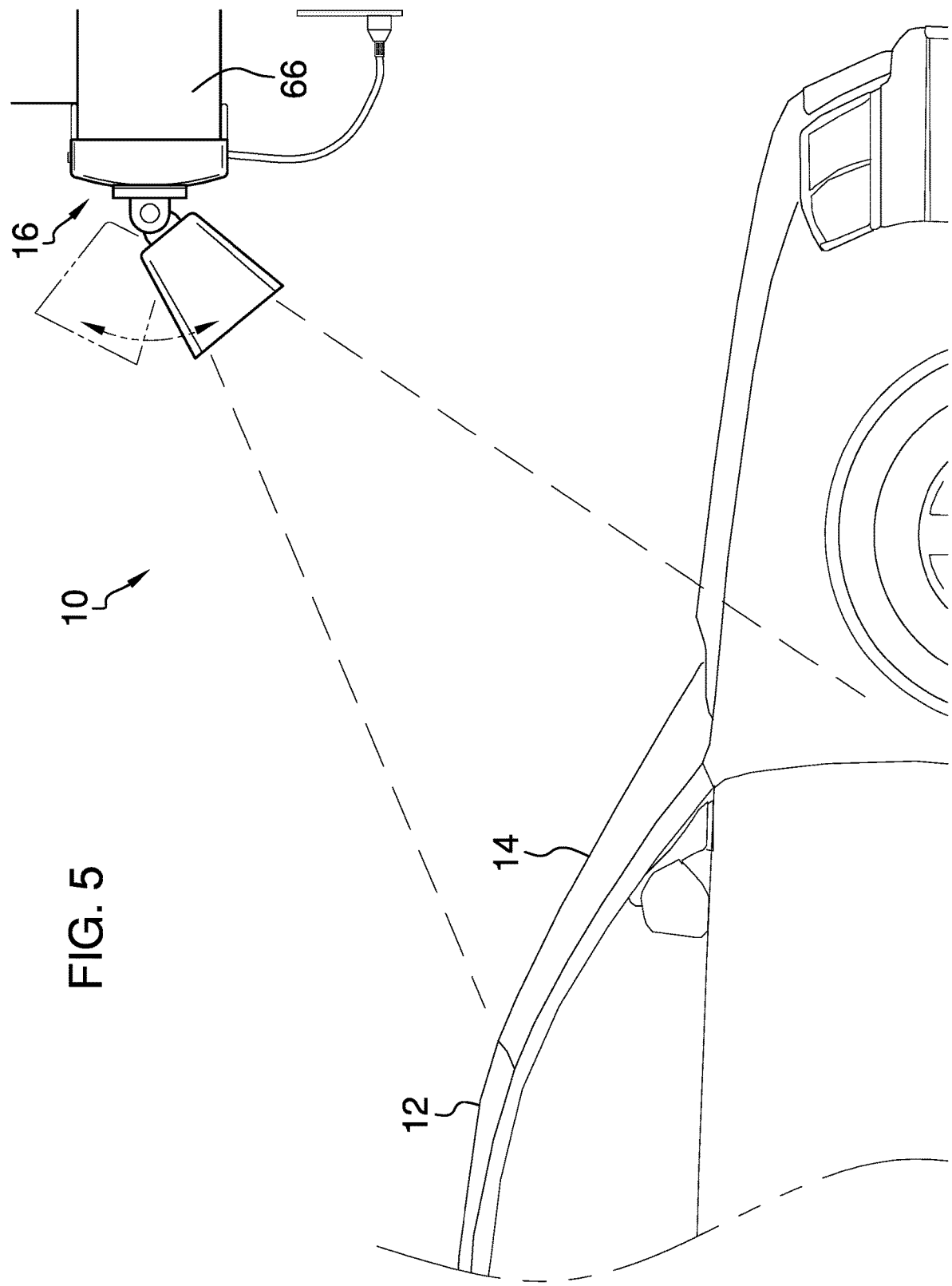
FIG. 5 is a perspective in-use view of an embodiment of the disclosure.

With reference now to the drawings, and in particular to FIGS. 1 through 5 thereof, a new heating device embodying the principles and concepts of an embodiment of the disclosure and generally designated by the reference numeral 10 will be described.

As best illustrated in FIGS. 1 through 5, the windshield heating system 10 generally comprises a vehicle 12 that has a windshield 14. The vehicle 12 may be a passenger vehicle, a truck or any other motorized vehicle 12 that has a windshield 14. Additionally, the vehicle 12 may be parked outdoors during fall and winter months. A heat lamp unit 16 is provided and the heat lamp unit 16 is removably coupled to a support 66 and the heat lamp unit 16 is pointed toward the windshield 14 of the vehicle 12. The heat lamp unit 16 selectively emits electromagnetic radiation to melt frozen precipitation from the windshield 14.

The heat lamp unit 16 comprises a housing 18 that has a front side 20 and a back side 22. A pair of grips 24 is provided and each of the grips 24 is coupled to the back side 22. The grips 24 are spaced apart from each other and each of the grips 24 selectively engages the support. In this way the housing 18 is removably coupled to the support having the front side 20 of the housing 18 being directed toward the windshield 14.

A processor 26 is positioned within the housing 18 and the processor 26 may be an electronic processor 26 or the like. A receiver 28 is positioned within the housing 18 and the receiver 28 is electrically coupled to the processor 26. The receiver 28 may be a radio frequency receiver 28 or the like. A timer 30 is positioned within the housing 18 and the timer 30 is electrically coupled to the processor 26. The timer 30 may be an electronic timer or the like and the timer may include a calendar.

A pair of cones 32 is provided and each of the cones 32 is hingedly coupled to the front side 20 of the housing 18. In this way each of the cones 32 is tiltable into a selected angle with respect to the front side 20. Each of the cones 32 has a distal end 34 with respect to the housing 18 and the distal end 34 corresponding to each of the cones 32 is open. Each of the cones 32 may be comprised of a light reflecting material.

A pair of light emitters 36 is provided and each of the light emitters 36 is positioned in an associated one of the cones 32. Each of the light emitters 36 is electrically coupled to the processor 26 such that the processor 26 selectively turns each of the light emitters 36 on and off. The processor 26 turns each of the light emitters 36 off after the timer 30 counts the countdown. Each of the light emitters 36 emits electromagnetic radiation outwardly from the associated cone 32 when each of the light emitters 36 is turned on. Moreover, each of the light emitters 36 may be a 200.0 watt incandescent, infra-red light bulb or the like. The light emitters 36 direct the electromagnetic radiation onto the windshield 14 thereby heating the windshield 14 and the frozen precipitation above the melting point of water.

A plurality of buttons 37 is coupled to the housing 18 and each of the buttons 37 is electrically coupled to the processor 26. The plurality of buttons 37 is positioned at any selected location on the housing 18. Each of the buttons 37 controls operational parameters of the timer 30 to include a selected day of the week, time and duration that each of the light emitters 36 is turned on. The timer 30 may have a selectable countdown ranging between 1.0 hours and 4.0 hours. In this way the timer 30 selectively turns the light emitters on and off according to the selected countdown.

A power cord 38 is coupled to and extends outwardly from the housing 18 and the power cord 38 is electrically coupled to the processor 26. The power cord 38 has a distal end 40 with respect to the housing 18 and a plug 42 is electrically coupled thereto. The plug 42 may be electrically coupled to a power source such as an electrical outlet or the like.

A remote control 44 is provided and the remote control 44 may be manipulated. The remote control 44 turns the heat lamp unit 16 on and off. The remote control 44 comprises a remote processor 46 that is positioned within the remote control 44. A transmitter 48 is positioned within the remote control 44 and the transmitter 48 is electrically coupled to the remote processor 46. The transmitter 48 is in electrical communication with the receiver 28 such that the remote control 44 controls operational parameters of the heat lamp unit 16. The transmitter 48 may be a radio frequency transmitter 48 or the like.

A button 50 is coupled to the remote control 44 and the button 50 may be manipulated. The button 50 is electrically coupled to the processor 26 and the processor 26 selectively turns each of the light emitters 36 on and off when the button 50 is manipulated. A remote power supply 52 is removably positioned within the remote control 44 and the remote power supply 52 is electrically coupled to the remote processor 46. The remote power supply 52 comprises at least one battery 54.

In use, the housing 18 is positioned on the support such that the front side 20 of the housing 18 faces the vehicle 12. Each of the cones 32 is manipulated to direct the light emitters 36 toward the windshield 14 of the vehicle 12. The remote control 44 is manipulated to turn each of the light emitter on prior to driving the vehicle 12. In this way each of the light emitters 36 melts frozen precipitation on the windshield 14 thereby facilitating the vehicle 12 to be driven. The timer 30 turns each of the light emitters 36 off when the timer 30 finishes the countdown.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windshield heating system being configured to melt frozen precipitation from a windshield, said system comprising:

a vehicle having a windshield; and a heat lamp unit being configured to be removably coupled to a support extrinsic to said vehicle, said heat lamp unit being positioned extrinsic to said vehicle and pointed toward said windshield of said vehicle, said heat lamp unit selectively emitting electromagnetic radiation wherein said heat lamp unit is configured to melt frozen precipitation from said windshield, said heat lamp unit comprising:

a housing having a front side and a back side;

a pair of grips, each grip of said pair of grips being coupled to said back side, said grips of said pair of grips being spaced apart from each other, each of said grips of said pair of grips being configured to engage the support wherein said housing is removably coupled to the support having said front side of said housing being directed toward said windshield, a processor being positioned within said housing, a receiver being positioned within said housing, said receiver being electrically coupled to said processor, a timer being positioned within said housing, said timer being electrically coupled to said processor, a pair of cones, each cone of said pair of cones being hingedly coupled to said front side of said housing wherein each cone of said pair of cones is tiltable into a selected angle with respect to said front side, each cone of said pair of cones having a distal end with respect to said housing, said distal end of each cone of said pair of cones being open, and a pair of light emitters, each light emitter of said pair of light emitters being positioned in an associated one of said cones of said pair of cones, each light emitter of said pair of light emitters being electrically coupled to said processor wherein said processor selectively turns each light emitter of said pair of light emitters on and off, said processor turning each light emitter of said pair of light emitters off after said timer counts a pre-determined amount of time, each light emitter of said pair of light emitters emitting the electromagnetic radiation outwardly from said associated cone one of said cones of said pair of cones, and a power cord being coupled to and extending outwardly from said housing, said power cord being electrically coupled to said processor, said power cord having a distal end with respect to said housing, said distal end having a plug being electrically coupled thereto, said plug being configured to be electrically coupled to a power source; and a remote control being configured to be manipulated, said remote control turning said heat lamp unit on and off, said remote control comprising:

a remote processor being positioned within said remote control, a transmitter being positioned within said remote control, said transmitter being electrically coupled to said remote processor, said transmitter being in electrical communication with said receiver wherein said remote control controls operational parameters of said heat lamp unit, a button being coupled to said remote control wherein said button is configured to be manipulated, said button being electrically coupled to said remote processor, said remote processor selectively turning each light emitter of said pair of light emitters on and off when said button is manipulated, and a remote power supply being removably positioned within said remote control, said remote power supply being electrically coupled to said remote processor, said remote power supply comprising at least one battery.

\* \* \* \* \*